Figure 1:
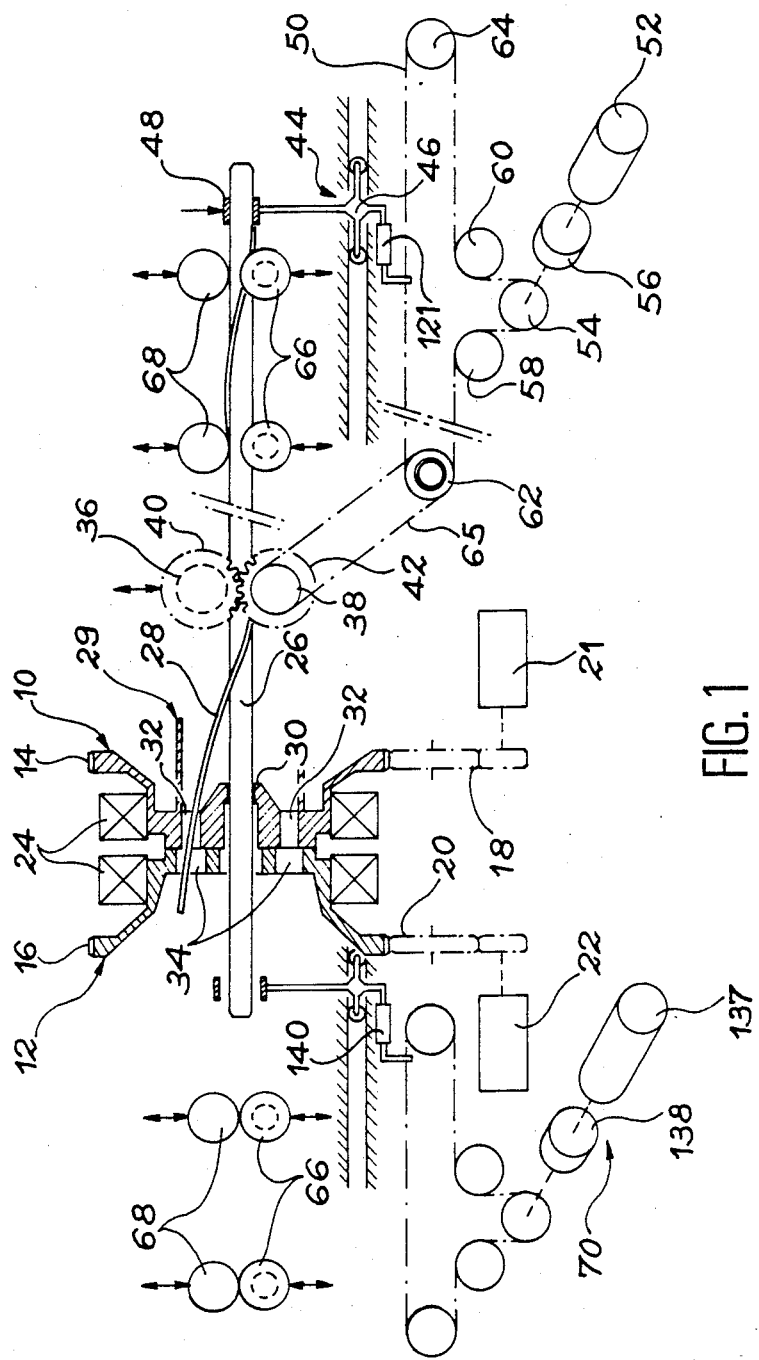

United States Patent [19]

Colas

[11] Patent Number: 4,898,710

[45] Date of Patent: Feb. 6, 1990

[54] MACHINE FOR REMOVING THE SPACING WIRE OF NUCLEAR FUEL RODS

[75] Inventor: Jean Colas, Bagnols sur Ceze, France

[73] Assignee: Commissariat a l'Energie Atomique, Paris, France

[21] Appl. No.: 278,023

[22] Filed: Nov. 30, 1988

[30] Foreign Application Priority Data

Dec. 7, 1987 [FR] France .............................. 87 16979

[51] Int. Cl.⁴ ...................... G21C 19/33; G21C 19/36
[52] U.S. Cl. .................................. 376/261; 29/426.4; 83/200
[58] Field of Search .................. 376/260, 261; 83/200, 83/199, 580, 923; 29/723, 906, 426.4, 33 F; 140/123.6, 139

[56] References Cited

U.S. PATENT DOCUMENTS 4,412,466  11/1983  Jurkowski .............................. 83/200
4,592,715   6/1986  Nebelung .............................. 83/200

FOREIGN PATENT DOCUMENTS 0118328  9/1984  European Pat. Off. .
1529707  6/1968  France .
2297480  8/1976  France .

Primary Examiner—Daniel Wasil
Attorney, Agent, or Firm—Kerkam, Stowell, Kondracki & Clarke

[57] ABSTRACT

Machine for removing the spacing wire (28) from a nuclear fuel rod (26). The rod (26) is moved through the central passages of first (10) and second (12) rotary parts. The first rotary part (10) has a portion in the form of a milling cutter (30) for detaching the welding spots from the wire (28) on the rod (26). As the rod advances, the wire (26) passes into the holes (32) of the first rotary part (10) and the holes (34) of the second part (12). As these two parts rotate at different speeds, the wire (28) is cut by shearing. Application to the reprocessing of the irradiated fuels of fast neutron nuclear reactors.

15 Claims, 6 Drawing Sheets

MACHINE FOR REMOVING THE SPACING WIRE OF NUCLEAR FUEL RODS

The present invention relates to a machine for removing the spacing wire of nuclear fuel rods, applicable more particularly, but not exclusively, to the rods used in fast neutron nuclear reactors.

In connection with the reprocessing of irradiated fuel, it is necessary to remove the spacing wire helically surrounding the rods prior to the shearing of the latter. It is desirable for this operation to be carried out by an automatic machine in a short period of time (i.e. less than 1 minute) and it is desirable for the wire waste to be conditioned to a minimum volume.

There are at present two types of machine for removing the spacing wire from nuclear fuel rods.

The first type of machine is used exclusively for removing the wire from rods radially covering fast neutron nuclear reactors. In the case of these machines, milling takes place of the welding spots used for fixing the spacing wire to the rods and the wire is wound into small coils. Initially, with such rods, the spacing wires are sufficiently ductile and therefore deformable to be wound by the said machine into small coils.

However, after use of the rods winding of the wire is not applicable to the spacing wires of fuel rods, because the high degree of irradiation which they have undergone has made the wires brittle and the slightest curvature leads to the breaking thereof.

FR-A-2 539 660 describes a second type of machine able to remove the spacing wire from fuel rods. This machine has a series of electrodes surrounding the rods in a cross-section of the latter. A series of electric arcs is successively struck between each electrode and the rods. As the impact points of the arc on the needle overlap, at least one of these arcs brings about the breaking of the wire. The rods is advanced by a certain distance and the series of electric arcs is again struck.

This process operates correctly, but suffers from two main disadvantages. Firstly, the striking of the arc requires a high frequency voltage source, which introduces a large amount of interference into the control automatisms of the other components as a result of the "antenna effect" by the cables of all the transducers operating with low currents. Moreover, the cutting length of the wire parts is relatively great (approximately 250 mm) due to the need to limit the number of arcs struck for a given rods. Thus, these arcs lead to pollution and wear to the electrodes at each cut, which limits the life of the electrodes. Moreover, the considerable length of the thus cut wire parts does not permit a good stacking in the containers used for the disposal thereof, which represents a high waste volume.

The present invention aims to obviate these disadvantages by proposing a machine; permitting the simple, rapid cutting of the spacing wire of nuclear fuel rods into sections of short length (approximately 10 mm), which makes it possible to have a high degree of compactness during the natural dropping of these portions into a receptacle. The inventive machine is used for removing the spacing wire from a nuclear fuel rods, the wire being helically wound around the rods, which is substantially cylindrical.

According to the main feature of said machine, it comprises:

a first and a second rotary parts rotatable about the same axis and having in each case:

a front face, a rear face, the front face of the second rotary part being substantially in contact with the rear face of the first, a central passage along which it is possible for said rods to pass, said passage having an inlet on the front face and an outlet on the rear face and having a substantially cylindrical shape, whose axis coincides with the said rotation axis and a series of holes through each of which the wire can pass, said holes being further than the central passage from the rotation axis and having an inlet on the front face and an outlet on the rear face, the arrangement being such that the outlet of one hole of the first rotary part can coincide at least partly with the inlet of a hole of the second rotary part, means for rotating the first rotary part, means for rotating the second rotary part, and means for the displacement in translation of the rods along its axis to make it pass through the central passages of the rotary parts.

In general, the wire is fixed to the rods by at least one welding spot, in most cases one welding spot at each end. In this case, the inlet of the central passage of the first rotary part has slightly larger dimensions than the cross-section of the rods and the first rotary part comprises:

a part in the form of a milling cutter positioned level with said inlet and constructed so as to break the welding spot when the rods penetrates said central passage through the inlet and a part shaped like a truncated cone widening from said milling cutter-like part up to the area where the hole or holes of the first rotary part are located.

As will be shown hereinafter, the means for displacing the rods are arranged so as to penetrate the same, firstly in the central passage of the first rotary part by the inlet of said passage. The milling cutter-like part makes it possible to detach the welding spot and the end of the thus freed wire passes on to said truncated cone-shaped part and enters a hole in the first rotary part during the advance of the rods under the action of the means for driving the latter. With the movement continuing, the wire completely traverses the hole of the first rotary part. As the two rotary parts are rotated at different speeds, a time arrives when the hole of the first part more or less coincides with a hole of the second part and the wire can penetrate the hole of the second part. As the rotary movement continues, the wire is finally sheared at the time when said two holes no longer coincide.

Thus, by shearing, it is easily possible to obtain short wire lengths, the length of said portions being determined by the speed of advance of the rods, the shape and the dimensions of the holes, as well as the rotary speeds of the two rotary parts.

According to another feature of the machine according to the invention, the aforementioned driving means are located on one side of the assembly constituted by the two rotary parts and the machine has other driving means located on the other side of said assembly.

Thus, with the driving means arranged so as to penetrate the needle in the central passages of the two rotary parts by the inlet of the first of said two parts, it is necessary to drive and guide the needle once it has completely traversed these two parts.

According to another aspect of the invention, said machine also has means for applying the wire to the rods before the latter penetrates the central passage of one of the rotary parts, in principle the first.

According to a preferred embodiment, said application means comprise a first roller having a groove able to receive the rods, a second roller having a groove able to receive the rods, the dimensions of the two rollers being such that their tangential speeds at the point of contact with the rods are equal, means for forcing the second roller towards the first and means for simultaneously rotating the two rollers.

Preferably, the two rollers are toothed rollers of the same diameter meshing on one another and said means for simultaneously rotating these two rollers comprise means for rotating the first roller in synchronized manner with the means for the translation of the needle, in order that said tangential speed is equal to the speed imparted to the needle by said translating means.

The aim of these means for applying the wire to the rods is to keep the wire taught on the rods once the first welding point has been milled, in order that the end of the wire can slide on the truncated cone-shaped part of the first rotary part and can enter the holes of the first and second rotary parts.

The means for rotating the first rotary part are synchronized with the means for translating the rods, in order that the first rotary part performs a complete turn when the rods advances by a distance equal to the spacing of the spacing wire.

Thus, the rods is translated through the central passages of the rotary parts and is immobilized in rotation. As the wire is helically wound around the rods, as it cuts the latter, its end moves in a cross-section of the rods. This synchronization ensures that the wire part between the said pressing rollers and the first rotary part is not deformed by differential rotation of the maintaining points of its ends, which would make it impossible for it to penetrate the holes or continue its advance in one of said holes.

According to another feature of the machine according to the invention, the means for translating the rods comprise a carriage, a gripper integral with said carriage and able to grip the rods and means for the translation of the carriage.

In this case, it is preferable for the drive means to also comprise a force or stress limiter in order to control the force or stress exerted by the gripper on the rods. As will be shown hereinafter, this force limiter is particularly useful at the start and finish of the operation when the milling cutter-like part of the first rotary part detaches the welding points of the wire on the rods.

In the preferred embodiment, the carriage is driven by an endless chain actuated by a motor, with which is associated a torque limiter and it is the latter which provides the force limiter function.

It is advantageously possible to provide a programmable automation controlling the complete detachment cycle of the wire from a given rods. In this case, it is possible to provide a force transducer linked on the one hand with the drive means and on the other with said programmable automation. Thus, said transducer can detect the start and finish of the milling operation and can make the automation pass to the following phase of the wire cutting cycle. Finally, according to a final aspect of the invention, the machine comprises at least one rods guide system. Preferably, the latter comprises a first roller having a groove able to receive the rods, a second roller which can be contacted with the rods, when the latter is in said groove and means for applying the second roller to the first.

In the preferred embodiment, the first roller is placed beneath the second and has a substantially horizontal axis. The application means comprise an arm rotatable about a horizontal shaft carried by the machine and having a free end on which is mounted the second roller and a counterweight, which can be fixed to said arm at a desired point between its free end and said shaft carried by the machine.

In general, there are several guide systems constituted by two rollers, as indicated hereinbefore. The fact that it is possible to move the counterweight along the arm and fix it at a given location makes it possible to accurately determine the application force of the second roller to the rods.

The invention is described in greater detail hereinafter relative to non-limitative embodiments and with reference to the attached drawings, wherein show:

FIG. 1: A diagrammatic view of the complete machine according to the invention.

Figure 2:
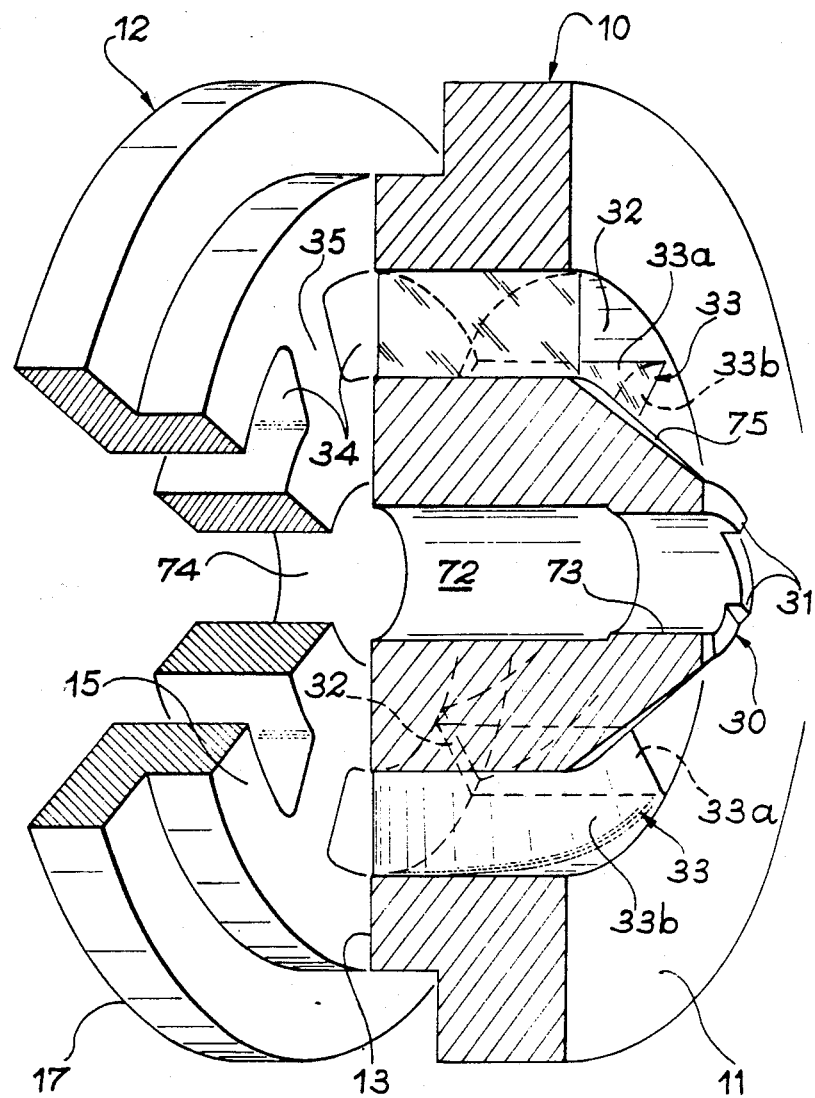

FIG. 2: A diagrammatic, larger scale, sectional and perspective view of the first and second rotary parts.

Figure 3:
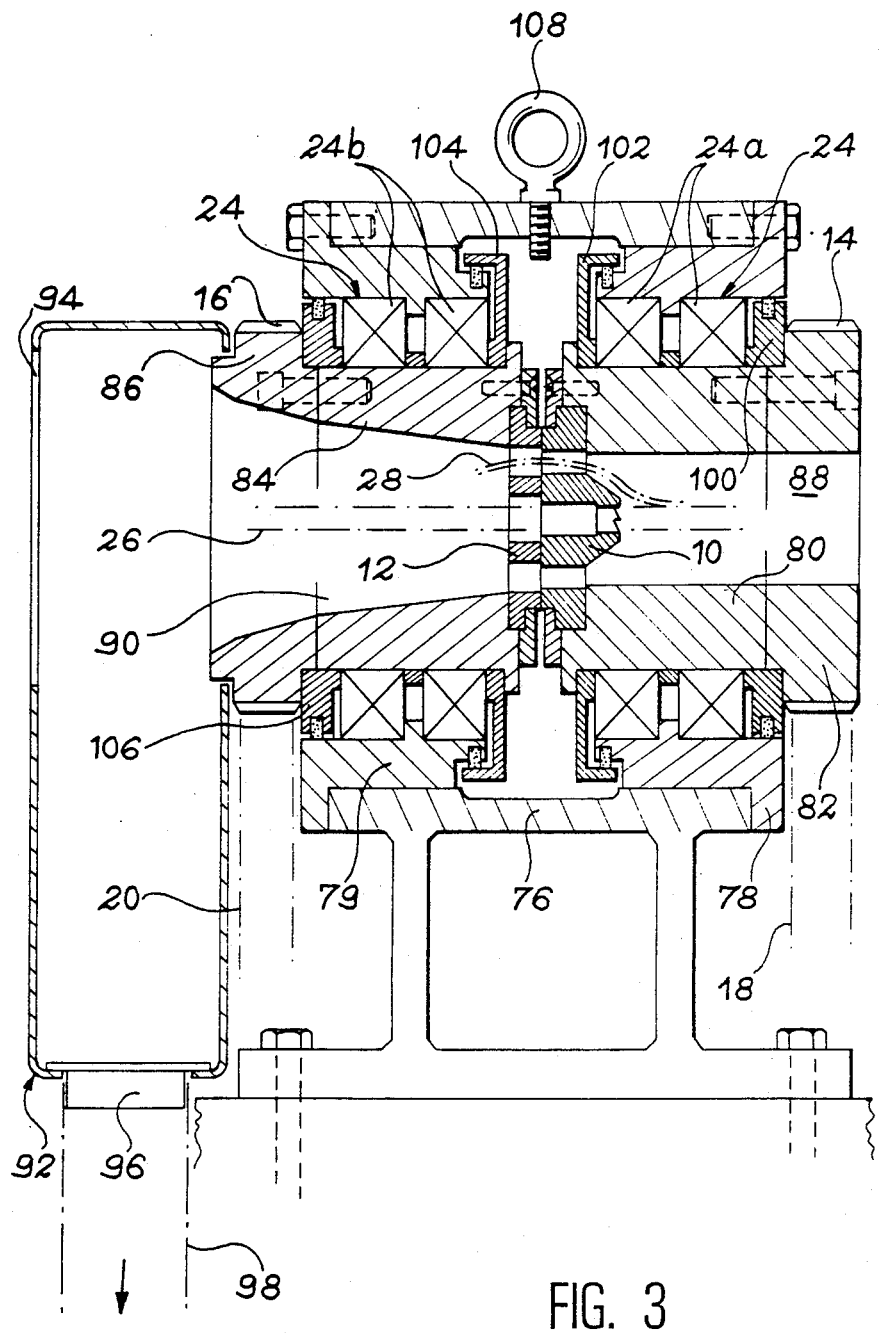

FIG. 3: A vertical sectional view showing how the means for rotating these two rotary parts are mounted.

Figure 4:
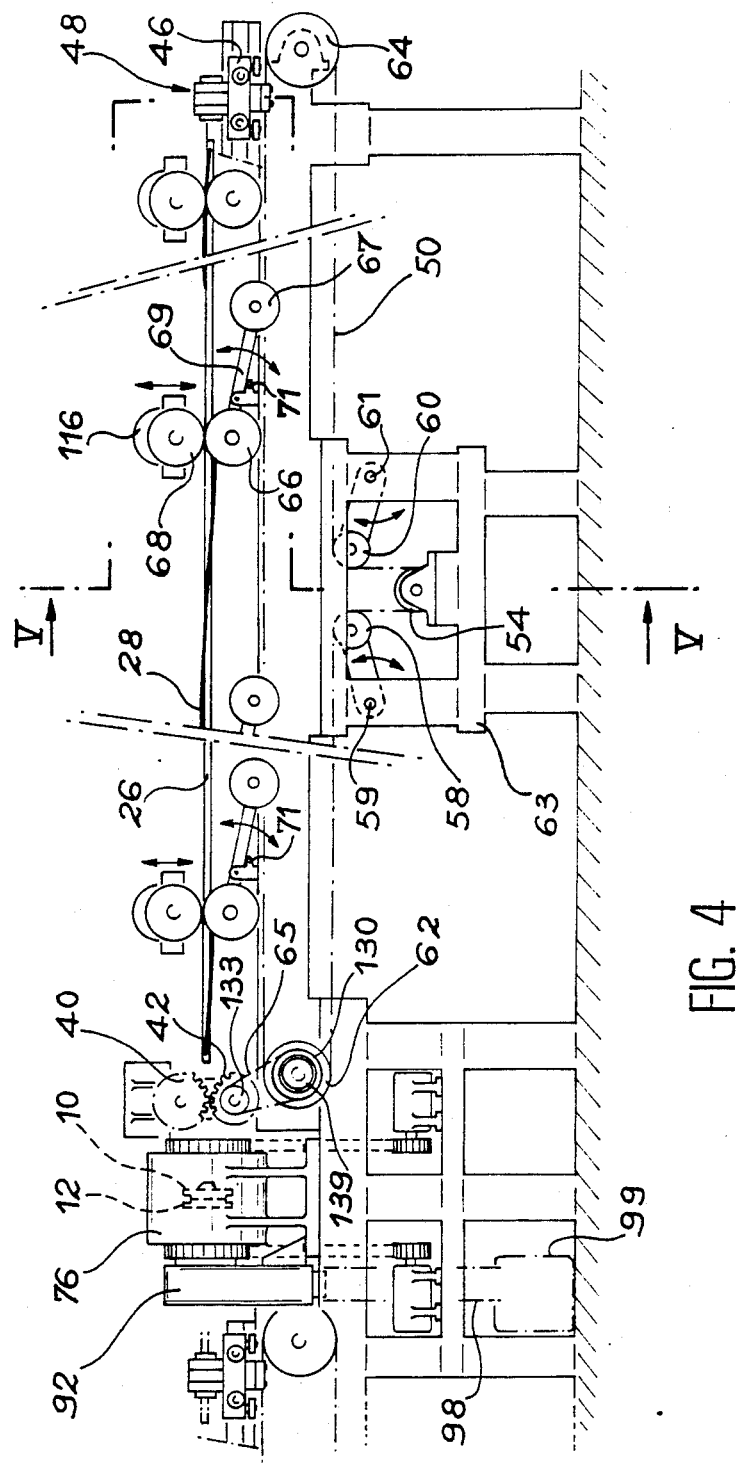

FIG. 4: A diagrammatic view in elevation showing the means for translating the rods on which is wound the wire to be removed.

Figure 5:
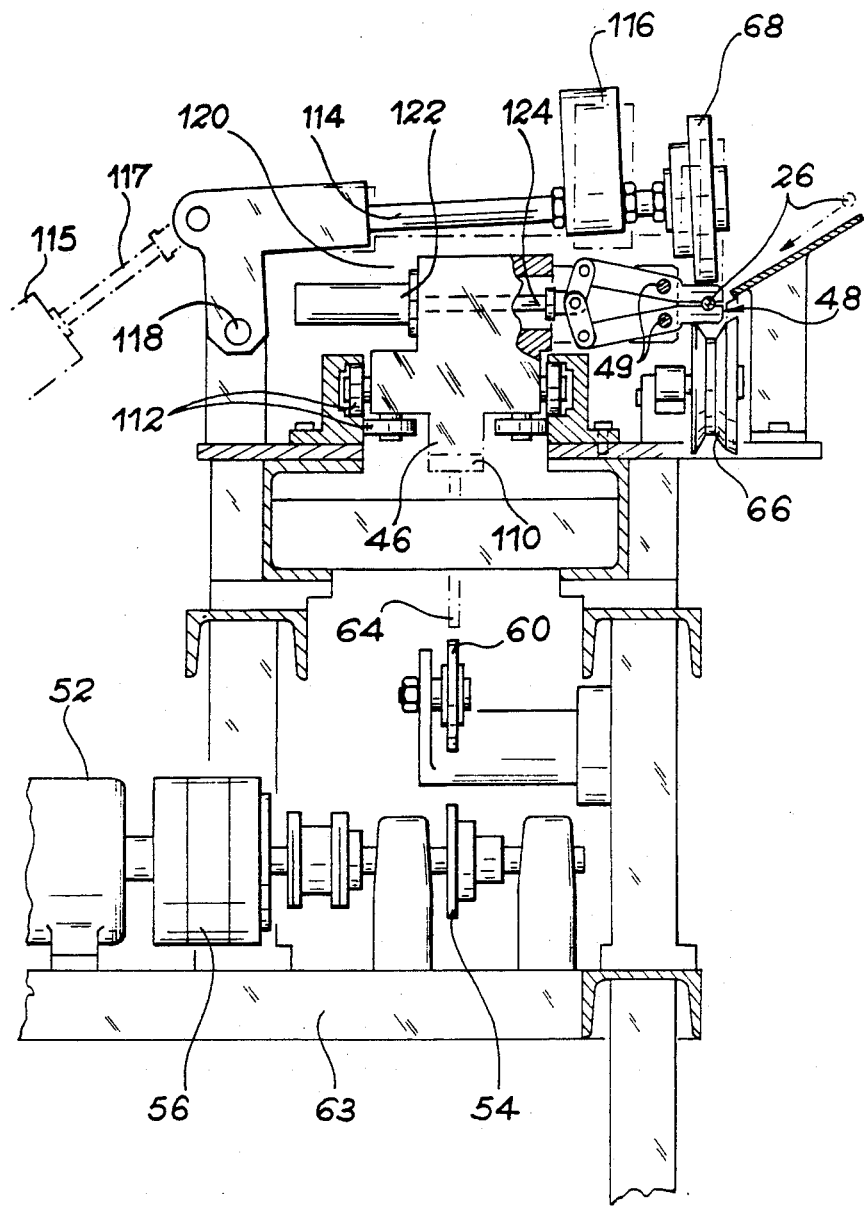

FIG. 5: A sectional view along line V—V of FIG. 4.

FIGS. 6a to 6e: Diagrammatic views showing the cycle of removing the wire wound on to a rods.

On referring to FIG. 1, it can be seen that said machine essentially comprises two rotary parts, namely a first rotary part 10 and a second rotary part 12. Each of these parts has a front face located on the right-hand side on considering the drawing and a rear face located on the left-hand side. These two parts have a common rotation axis. The rear face of the first part 10 has a generally planar shape and is perpendicular to the rotation axis, in the same way as the front face of the second rotary part 12. Thus, said two faces can be contacted with one another. This arrangement makes it possible to shear the wire, as will be explained hereinafter.

The two rotary parts 10, 12 are respectively integral with toothed rims 14, 16. The latter are connected to pinions 18, 20 started up by means of motors 21, 22 respectively. Bearings 24 enable each of the two parts 10, 12 to rotate within a cylindrical support. The means for mounting and rotating parts 10, 12 will be described hereinafter relative to FIG. 3.

In its central part and on its front face, the first rotary part 10 has a milling cutter-shaped portion 30 with an opening having a slightly larger diameter than that of the rods 26 on which is wound the wire 28. The latter is generally fixed to the two ends of the rods by welding spots. This milling cutter is used for breaking the first welding spot and for detaching the front end of the wire when the front end of the rods is introduced into the central passage provided in the centre of the rotary part 10 and for destroying the second welding spot at the end of the cycle. The wire having been detached in this way and the rods 26 continuing its translation movement from right to left considering FIG. 1, the front end of the wire passes on to a truncated cone-shaped portion and passes into a hole 32 provided on the first rotary part 10 and it can then pass into a hole 34 provided on the second rotary part 12. As motors 21 and 22 are regulated in such a way that the two parts have different rotation speeds, the wire is cut by shearing at the instant when the holes 32 and 34 no longer coincide. The rotary parts 10, 12 will be described in greater detail hereinafter relative to FIG. 2.

In order to ensure that the wire does penetrate the holes 32 of the first rotary part 10, it is possible to provide a guidance system, e.g. formed by a cylindrical tube 29, whose internal diameter is substantially equal to that of the space occupied by holes 32.

FIG. 1 shows that there are two toothed rollers 36, 38, whereof the portions constituting toothed wheels carry the references 40, 42 respectively. Roller 38 is fixed and is located below rods 26, whilst roller 36 is above the latter and can be applied thereto, as is symbolized by the double arrow in FIG. 1. Rollers 36, 38 are moved via drive means 44, which will be described with reference to FIGS. 4 and 5. The function of rollers 36, 38 is to exert a pressure on the wire at a point slightly upstream of the rotary part 10 with respect to the displacement direction of the rods, in order to keep the wire taut and ensure that it can penetrate the holes 32, 34, as indicated hereinbefore.

Apart from their function of ensuring the synchronism of rotation of rollers 36, 38, the toothed wheels 40, 42 ensure the interpenetration of the two rollers, so that the wire does not escape therefrom when it is in contact with the circles corresponding to the pitch circles of the teeth. This might occur with smooth rollers, because the upper roller is not rigidly positioned from the height standpoint so as to enable it to adapt to the geometry of the section of the assembly constituted by the needle and the wire.

The rods displacement means 44 essentially comprise a carriage 46 mobile in translation and on which is integrally mounted a gripper 48 able to grip one end of the rods 26. Carriage 46 is connected to a chain 50 diagrammatically shown in mixed line form in FIG. 1. Chain 50 is moved by a motor 52, which acts on a pinion 54 via a torque limiter 56. As will be shown hereinafter, the carriage 46 can be connected to the chain 50 by a force transducer 121. The latter can also consist of a torque transducer mounted on the shaft of motor 52.

Pinions 58 and 60 can be displaced in order to give the chain 50 the desired tension, whilst the pinions 62, 64 are placed in a same horizontal chain, so as to define a horizontal portion of the chain corresponding to the displacement zone of carriage 46. A chain 65 connects pinion 62 to roller 38, in order to ensure the synchronism of the movements of the carriage 46 and the rollers 36 and 38, as will be described hereinafter relative to FIG. 4.

It is known to provide a series of rods guide systems constituted by a lower roller 66 and an upper roller 68. These rollers can be applied to the rods from bottom to top and top to bottom respectively, as indicated by the double arrows in FIG. 1 and their installation will be described in greater detail hereinafter relative to FIG. 5.

In FIG. 1, the rods displacement means 44 are located on the right-hand side with respect to the rotary parts 10 and 12. However, there are other displacement means 70 on the left-hand side considering FIG. 1, i.e. following the rotary parts 10, 12 with respect to the rods displacement direction. Thus, it is clear that it is necessary, after the rods has traversed the rotary parts 10, 12, to drive it and guide it up to a storage or waiting point prior to the transportation thereof elsewhere. Moreover, in the preferred embodiment of the invention illustrated here, it is necessary for the gripper 48 to release the rods before the end thereof passes between rollers 36, 38. It is consequently at this moment when the rods is taken up at its other end by other translation means until it has completely traversed the two rotary parts. Means 70 can be identical to means 44 and will not be described in detail here.

FIG. 2 shows in greater detail the constitution of the rotary parts 10 and 12. It can be seen that these two parts have been placed substantially in accordance with a vertical plane and are mobile in rotation about a horizontal axis. The first rotary part 10 has a front face 11 and a rear face 13, whilst the second rotary part has a front face 15 and a rear face 17. The front faces are located on the right-hand side of the facing parts of FIG. 2, whilst the rear face is located on the left-hand side.

Part 10 has a substantially cyndrical central passage 72 and having an axis of revolution coinciding with the common rotation axis of parts 10 and 12. The part 12 has an also cylindrical central passage 74, whose axis coincides with said rotation axis. Passages 72, 74 completely traverse parts 10, 12 respectively.

In its central portion, part 10 has a milling cutter-like portion 30 surrounding the inlet of passage 72. At this location, the latter has a narrow portion 73, whose diameter is equal to or slightly larger than the rods diameter. On introducing the first end thereof into portion 73 of passage 72, part 10 rotates and at a given time the teeth 31 of milling cutter 30 are in contact with the first welding spot used for fixing the wire to the first end of the rods. As the latter is constantly pushed to the left by the drive means, the teeth 31 detach the welding spot and the free end of the wire slides on to a truncated cone-shaped portion 75 located between milling cutter 30 and the area of part 10 where the holes 32 are located. It should be noted that portion 75 widens from the milling cutter 30 up to the holes 32, because the latter surround the central passage 72. Two adjacent holes 32 are separated by a partition 33, which serves to guide and hold the wire when the latter is cut by shearing, as will be shown hereinafter.

Each partition 33 has a planar face 33a and a curved face 33b. The plane of face 33a is a radial plane, i.e. it contains the rotation axis of the assembly. The shape of face 33b is such that the partition 33 thickens from the inlet face to the outlet face. On the side of the inlet face of part 10, the two faces of partitions 33 join along an edge disposed radially, whilst each hole 32 issues on to the outlet face of part 10 by a thin slit which is positioned radially. As a result of this arrangement, certainty is obtained that the wire penetrates a hole 32 during the rotation of the part 10 and the shearing of the wire is facilitated.

The rear face 13 of part 10 and the front face 15 of part 12 at least have their central portion planar and perpendicular to the rotation axis. Parts 10 and 12 are arranged in such a way that a small clearance is made between faces 13 and 15.

It can also be seen that part 12 has a series of holes 34 regularly distributed around the central passage and separated from one another by solid parts forming shears 35.

In order to cut the wire, parts 10 and 12 are rotated, either in opposite directions to one another, or in the same direction, but at different speeds. Thus, at a particular time a hole 32 of part 10 more or less coincides with a hole 34 of part 12. As the rods continues its movement from right to left, the wire passes through part 10 following a hole 32 and penetrates a hole 34 of part 12. The movement continues until the coincidence between the two holes stops, which leads to the shearing of the wire between a partition 33 of part 10 and a shear 35 of part 12. The rotary movements of parts 10, 12 as well as the forward movement of the rods are regulated in such a way that shearing takes place when a certain wire length has passed beyond the rear face 17 of part 12, so that the cut wire fragment can drop naturally by gravity into a receptacle, which will be described relative to FIG. 3. The means for rotating the first rotary part 10 are synchronized, except during the milling phase, with the translating means of rods 26, so that the first rotary part 10 performs a complete turn when rods 26 advances by a distance equal to the spacing of the spacing wire 28.

It is possible to see in greater detail the means for mounting the rotary parts 10, 12 on the machine and the means for rotating the same. It can be seen that the mounting means essentially comprise a horizontally axed, hollow cylindrical support 76 mounted in fixed manner on the machine frame. Within support 76 are mounted a first bush 78 on the right-hand side when considering the drawing and a second bush 79 on the left-hand side. The two parts 10 and 12 are mounted in such a way that the rear face of the part 10 are separated by a very small clearance from the front face of part 12.

Part 10 is joined to a cylindrical body 80, to which is fixed a part 82 carrying on its periphery the toothed rim 14 mentioned in connection with FIG. 1. Part 82 is rotated (thus leading to the rotation of body 80 and therefore part 10) by means of a pinion 18 diagrammatically shown in mixed line form on FIG. 3.

In the same way, part 12 is joined to a cylindrical body 84, which is in turn joined to a part 86 carrying the toothed rim 16. The latter is moved via pinion 20 referred to in connection with FIG. 1 and which is diagrammatically shown in mixed line form in FIG. 3.

It should be noted that parts 80 and 82 are hollow in their central portion, thus providing a passage 88 for rods 26. The latter and wire 28 are shown in mixed line form in FIG. 3. In the same way, parts 84 and 86 are constructed so as to centrally provide a passage 90 for rods 26 once the latter has traversed parts 10 and 12. It should be noted that passage 88 is shaped like a cylinder, whose generatrixes are parallel to the rotation axis of the system, whilst passage 90 is shaped in such a way that its section regularly increases on moving away from the part 12. The objective of this is to provide in its lower part an inclined surface gradually descending as one moves away from part 12, so that the wire fragments 28 detached by shearing between parts 10 and 12 can drop naturally into a receptacle 92.

The latter has an opening which can be made to coincide with the outlet opening of passage 90 and has a second opening 94 permitting the passage of the rods 26 once the latter has passed out of passage 90. The bottom of part 92 can be closed, so that receptacle 92 constitutes a "dustbin" for receiving the wire fragments. In a variant, the bottom of receptacle 92 is open and equipped with a ring enabling it to be linked with a chute 98, shown in mixed line form in FIG. 3, said chute ensuring the connection between receptacle 92 and another container for receiving the wire fragments.

Cylindrical bodies 80, 84 are mounted in rotary manner within bushes 78, 79 via bearings 24a, 24b respectively. Body 80 is integral with a front ring 100 and a rear ring 102 which surround the bearings 24a. In the same way, body 84 is integral with a front ring 104 and a rear ring 106, which surround the bearings 24b. Joints are provided between rings 100, 102 and bush 78 on the one hand and between rings 104, 106 and bush 79 on the other. During the rotation of the rotary parts, said joints ensure the sealing between the outside and the area where the bearings 24 are located. Optionally, a ring 108 screwed to the upper part of the cylindrical support 76 makes it possible to transport and hold the assembly.

It is obvious that this arrangement only constitutes an exemplified embodiment and the use of a different arrangement would not pass outside the scope of the invention.

A description will now be given of the means for translating the rods with reference to FIGS. 4 and 5. It is possible to see in the left-hand part of FIG. 4 a cylindrical support 76 within which are located the rotary parts 10 and 12, which are diagramatically shown in broken line form. It is also possible to see, to the left of support 76, the receptacle 92 which communicates, via chute 98, with the container or dustbin 92. In the right-hand part of the drawing, it is possible to see the drive pinion 54, mounted on a frame 63, by means of which the motor 52 drives the chain 50 (the motor and the torque limiter 56 not being visible in FIG. 4).

FIG. 4 also shows the two pinions 58 and 60 making it possible to regulate the chain tension. Each of these pinions is mounted at the end of an arm rotatable about a horizontal shaft 59, 61 respectively. Fixing these arms in a given angular position provides the desired tension for chain 50, diagrammatically shown in mixed line form. Starting from pinion 54, this firstly passes on to pinion 60 following a substantially vertical path, moves towards the right of the drawing following a substantially horizontal path and then arrives at roller 64. After passing round the latter, the chain returns along a horizontal path to roller 62 located in the vicinity of support 76. After passing around roller 62, the chain returns in the direction of frame 63 following a substantially horizontal path, passes onto pinion 58 and returns to pinion 54 after following a substantially vertical path. Carriage 46, carrying the gripper 48, is integral with chain 50, to which it can be connected by the force transducer 121 (FIG. 1) at a point located between rollers 64 and 62.

The installation of the carriage can be better gathered from the sectional view of FIG. 5. It is possible to see in the lower part thereof, the motor 52 which drives the pinion 54 via the torque limiter 56. It is also possible to see the roller 60 used for regulating the chain tension, as well as roller 64. For reasons of clarity, chain 50 is not shown in FIG. 5, but is fixed to the lower portion 110 of carriage 46 by the force transducer 121. This carriage is integral with rollers 112, which maintain it within parts defining a path along which it is possible to move in horizontal translation in a direction perpendicular to the plane of FIG. 5.

It is also possible to see the rollers 66 and 68 for guiding the rods 26. In the presently illustrated embodiment, roller 66 is positioned beneath the rods and rotates about a horizontal axis. Roller 66 can be connected to a counterweight 67 (FIG. 4) by means of an arm 69 able to pivot by a shaft carried by the machine frame. Under the effect of counterweight 67, roller 66 is forced downwards, i.e. towards rods 26. Its height position is defined by the arrival in the upper position against a fixed abutment during the rotation of arm 69 under the effect of counterweight 67. In the presently described embodiment, arm 69 comes into contact with an abutment 71, but it would not pass outside the scope of the invention to use another arrangement. The group of abutments 71 defines a nominal position for all the rollers 66.

Roller 68 is mounted at the free end of an arm 114 to which can be fixed a counterweight 116. Arm 114 rotates about a horizontal shaft 118 carried by the machine frame and the counterweight 116 can be moved along arm 114 and fixed at a random point thereof. By carefully choosing the location of counterweight 116 on arm 114, it is thus possible to determine the application force of roller 68 on rods 26. Thus, the latter is compressed between rollers 66 and 68 and is guided by them. As can be gathered from FIG. 4, there are several groups of rollers 66, 68 arranged along the path covered by the rods upstream of the rotary parts 10, 12. As rollers 66 and 68 are also mounted on arms able to freely oscillate with respect to the machine, they can move apart when the gripper 48 carried by carriage 46 passes between them (FIG. 5).

In another construction, the counterweight 116 is eliminated and the movements of arm 114 are controlled by a jack 115 connected to said arm by a rod 117 (jack 115 and rod 117 being shown in mixed line form in FIG. 5).

It should be noted that during the milling of the welding points at the ends of the rods, the speed of advance of the latter is limited by the height of the teeth of the milling cutter 30 and the rotation speed of the latter. Thus, a force limiter has been provided in the kinematic control chain of the gripper in order to carry out milling with a controlled axial force.

In the preferred embodiment, it is the torque limiter 56, which fulfils the force limiter function. A torque limiter essentially comprises two rotary parts, namely the "downstream" part (i.e. the part furthest from the motor) stops turning when the resistance torque exceeds a predetermined threshold, whereas the "upstream" part continues to rotate, driven by the motor. Thus, the two rotary parts slide on one another with a constant torque, which limits the force on chain 50 and it is this force which is measured by the force transducer 121 (FIG. 1).

The gripper 48 essentially comprises two arms mobile in rotation about shafts 49 carried by a part integral with carriage 46. In the presently illustrated embodiment, the gripper control system 120 is essentially constituted by a jack 122 equipped with a rod 124, whereof one end is connected to the arm of gripper 48 by articulations. Thus, the securing force of the gripper 48 on rods 26 is determined by the pressure supplied to the jack.

On again referring to FIG. 4, it is possible to see, immediately upstream of support 76, the tooth wheels 40, 42 forming part of the tooth rollers 36, 38 mentioned relative to FIG. 1. The pinion 62 on to which passes the chain 50 is integral in rotation with another pinion 130 via the freewheel 139, on which passes a chain 65 diagrammatically shown in mixed line form. Chain 65 passes on to another pinion 133 integral with toothed wheel 42. Thus, when the motor 52 (FIG. 5) is moved in order to displace the chain 50 and therefore carriage 46, said movement drives that of the pinion 130 and chain 65, i.e. the toothed rollers 38 and 36 serving to maintain the wire on the rods. Obviously, the diameters of pinions 62, 130 and 133 and rollers 36, 38 can be determined in such a way that the tangential speed of the rollers 36, 38 at their contact point with rods 28 is equal to the translation speed of carriage 46.

A description will now be given of the operation of removing the spacing wire from a nuclear fuel rod with particular reference to FIGS. 6a to 6e. Initially the position is that illustrated in FIG. 4, i.e. the complete rods 26 is located to the right of support 76 and its front end has not yet passed between rollers 36 and 38. In this position, the rods is held by the different groups of rollers provided with counterweights, such as 66 and 68. Still in the starting position, carriage 46 is located at the extreme right of its travel considering FIG. 4, i.e. in the vicinity of pinion 64. The jack 122 (FIG. 4) is manipulated so that the arms of the gripper 48 grip the rods in the vicinity of the rear end thereof with the desired force.

Figure 6:
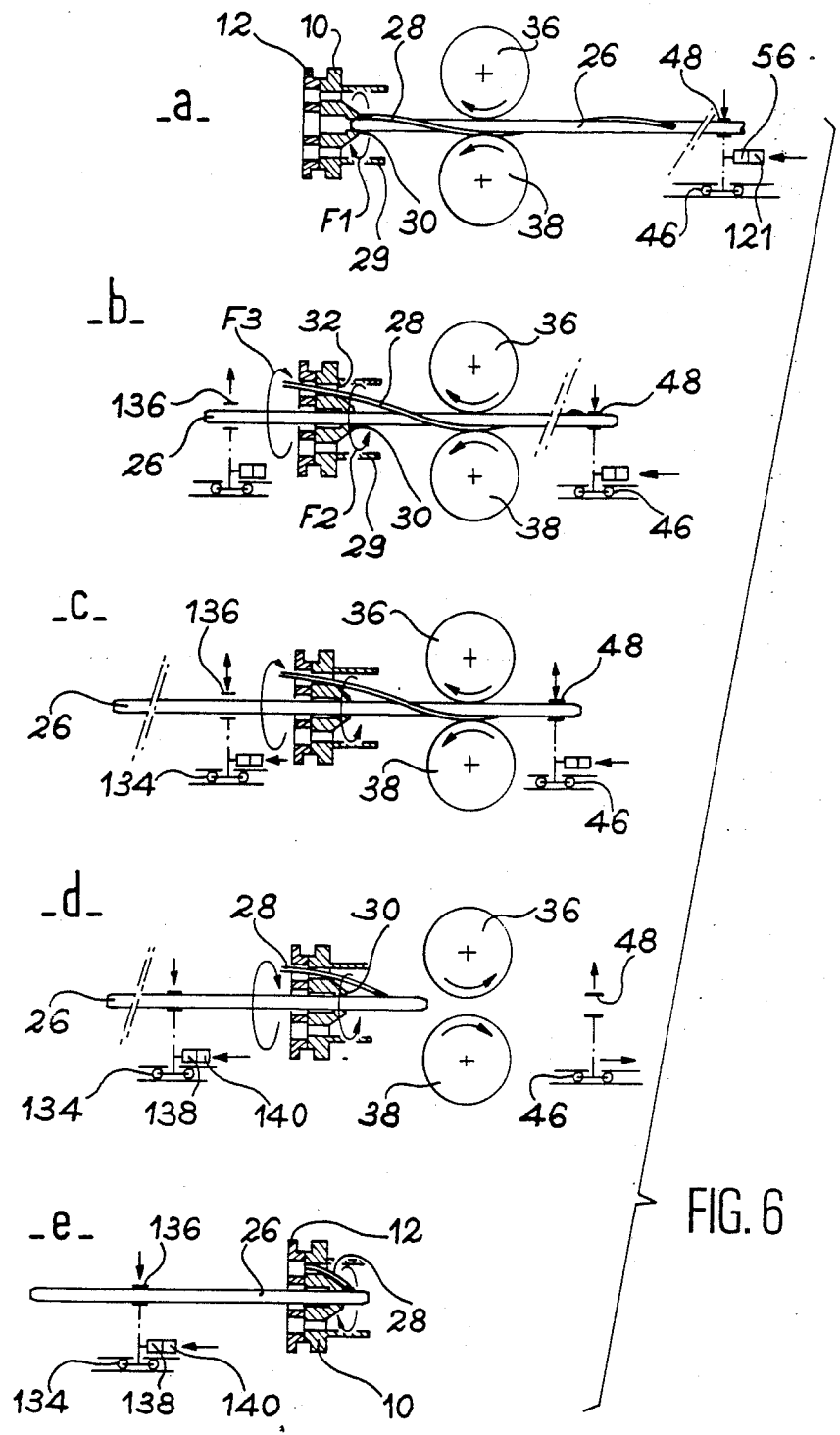

Motor 52 is started up, which brings about the movement of the chain and therefore the advance of the carriage from right to left considering FIG. 4. During this movement, the front end of the rods passes between rollers 36, 38 and comes level with the milling cutter 30, as illustrated by FIG. 6a. The rotary part 10 has previously been rotated in the direction indicated by arrow F1 in FIG. 6a. The rotation direction of part 10 during the milling of the welding spot is chosen so as not to risk reversing the winding direction of the wire when the latter is detached from the rods end. It should be noted that, as indicated hereinabove, during milling, a force is exerted on the rods and this has repercussions on the gripper. The force limiter 56 (constituted by the torque limiter and symbolically shown in FIG. 6a) is mounted in series with the force transducer 121, which is also symbolically shown therein. This transducer detects the start and finish of milling. In the preferred case, where a programmable automaton is used for controlling and checking the cutting cycle of the wire wound on to a rods, it is transducer 121 which makes the automaton pass to the following wire unwinding and cutting phase.

Once the first welding spot has been detached, the advance of the carriage 46 and therefore the gripper 48 is interrupted, as is the rotation of the first rotary part 10. The latter is then rotated in the reverse direction (arrow F2 in FIG. 6b). As indicated hereinbefore, the rotation speed of part 10 is synchronized with the advance speed of carriage 46, so that the part 10 performs a complete turn when the carriage and therefore the rods has moved by a distance equal to the winding pitch or spacing of the wire on the rods. This makes it possible to maintain the free end of the wire within the same hole 32 of part 10. As there are several holes 32 on part 10 and which are only separated by the thin edge of partitions 33 on the front face of part 10, this enables the wire to instantaneously find an exit by penetrating a hole. If this were not the case, it would buckle on striking against a wall separating two adjacent holes. Possibly such an arrangement would also make it possible to use a machine of this type for the removal and cutting several wires wound on to the same cylindrical part.

At the same time as part 10 is rotated in the direction of arrow F2, part 12 is rotated in the direction of arrow F3 in FIG. 6b. The rotation speed of part 12 is chosen as a function of the length of the wire portions which it is wished to obtain. The partitions 33 have a thin edge on the side of the front face of part 10, which guarantees the entry of the wire end into one of the holes 32. The carriage and therefore the rods continue to advance and a moment arrives when the end of the wire can penetrate one of the holes 34 of part 12. In the particular case illustrated in FIG. 6b, parts 10 and 12 rotate in opposite directions. Thus, a moment arises when the hole 32 stops coinciding with hole 34 of part 12, which leads to the breaking of the wire by shearing. Immediately following shearing, the end of the wire abuts against a solid part 35 separating two holes 34 of part 12. During this time, the rods advances by a certain distance. However, the elasticity of the wire portion compressed between rollers 36, 38 on the one hand and part 12 on the other is sufficient to compensate the momentary compression of the wire. In any case, at the end of a very short time, the end of the wire faces another hole 34 of part 12 and can penetrate the latter.

With the cycle continuing, one arrives at the position of FIG. 6c, where the rear end of the rods 26 arrives in the immediate vicinity of rollers 36 and 38. It is therefore necessary that at this instant, the gripper 48 moves apart and the rods is taken up by the drive means 70 diagrammatically shown in the left-hand part of FIG. 1. These drive means comprise a carriage 134 (FIG. 6c) on which is mounted a gripper 136. Carriage 134 and gripper 136 can be identical to carriage 46 and gripper 48. The second gripper 136 is driven in translation at a speed equal to that of gripper 48 and is manipulated in such a way as to grip the rods during this movement. Immediately afterwards, the first gripper 48 opens and its translation towards the left stops, so that it does not pass between the rollers 36 and 38. To enable the latter to continue to turn until the rods 28 has passed out of them, although at said instant the chain 50 is stationary, a freewheel 139 is provided and is associated with pinion 130 (FIG. 4). When gripper 48 opens, chain 50 stops, but the freewheel 139 permits the movement of chain 65 and therefore the rotation of rollers 36, 38 driven by friction on the rods, the latter being driven by gripper 136. It is possible to control the rapid return of carriage 46 to its starting position as soon as gripper 48 is open. This movement can be controlled by a programmable automaton connected to a transducer, which detects whether the gripper is open or closed. Optionally said programmable automaton can also control, at said instant, the raising of the pressing roller 68 by means of the jack system 115.

The situation is then as illustrated in FIG. 6d, where it is possible to see the second welding spot located at the rear end of the rods is close to milling cutter 30. The drive means 70 (FIG. 1) are preferably identical to the drive means 44 with a drive motor 137 associated with a torque limiter 138, which fulfils the function of the force limiter. The transducer 140 can be identical to transducer 121 and can be mounted in the same way. It is the second transducer 140 which detects the arrival of the second welding spot in contact with the milling cutter 30 by a force rise controlled by the force limiter 138. This signal triggers the reversal of the rotation direction of part 10 and a change in the rotation speed of said part. When the second welding spot is completely detached, the wire fragment left behind drops in front of part 10, whilst the following rods (which was introduced as soon as the carriage 46 returned to its starting position) in turn approaches the milling cutter 30. The cycle ends when the second gripper 136, after having completely extracted the rods not only from parts 10 and 12, but also from support 76 and receptacle 92, deposits it on a reception bench and returns to its starting position. The rods to be treated can be stored on another reception bench and can be introduced singly on to rollers 66. Guide means 66, 68 also equip the drive means 70.

The machine according to the invention has particularly interesting advantages, the most important of which is that it permits a rapid, effective cutting of the spacing wire of nuclear fuel rods without any significant wear to the cutting tool. Moreover, it can be regulated in such a way that the wire fragments are of limited length (approximately 10 mm), which leads to a high compactness level during their natural drop into a removal container. Moreover, such a machine permits a good efficiency, because a given rods can rapidly pass through the means and the following rods can be introduced immediately after the exit of the preceding rods.

Finally, it is obvious that the invention is not limited to the embodiment described hereinbefore and numerous variants can be envisaged without passing outside the scope of the invention. Thus, as a function of the envisaged application, the Expert can decide the shape and dimensions of the different parts constituting the machine, can determine the translation or rotation speeds of the different components, or can replace a particular element (e.g. the force limiters and transducers) by any equivalent means. Moreover, although in the case illustrated in FIGS. 6a to 6e, the parts 10 and 12 rotate in an opposite direction for the purpose of cutting the wire by shearing, it would not pass outside the inventive scope to make them rotate in the same direction, provided that they had different rotation speeds. Finally, although the pinions 36, 38 are generally regulated in such a way that their tangential speed at the contact point with the rods is equal to the translation speed imparted thereto by the carriage 46 and the gripper 48, it is also possible to regulate the pinion drive system in such a way that the rods translation speed is slightly slower than the tangential speed of the rollers, in order to make the wire slightly taut on the rods.

I claim:
1. Machine for removing the spacing wire (28) of a nuclear fuel rod (26), the wire (28) being helically wound around the rod (26) and the latter being substantially cylindrical, characterized in that the machine comprises:
   a first and a second rotary parts (10, 12) rotatable about the same axis and having in each case:
      a front face (11,15),
      a rear face (13, 17), the front face of the second rotary part (12) being substantially in contact with the rear face of the first (10),
      a central passage (72, 74) along which it is possible for said rod (26) to pass, said passage (72, 74) having an inlet on the front face and an outlet on the rear face and having a substantially cylindrical shape, whose axis coincides with the said rotation axis and
      a series of holes (32, 34) through each of which the wire (28) can pass, said holes (32, 34) being further than the central passage (72, 74) from the rotation axis and having an inlet on the front face and an outlet on the rear face, the arrangement being such that the outlet of one hole (32) of the first rotary part (10) can coincide at least partly with the inlet of a hole (34) of the second rotary part (12),
   means for rotating the first rotary part (10),
   means for rotating the second rotary part (12), and
   means (44) for the displacement in translation of the rod (26) along its axis to make it pass through the central passages (72, 74) of the rotary parts (10, 12).

2. Machine according to claim 1, characterized in that with the wire (28) fixed to the rod (26) by at least one welding spot, the inlet of the central passage (72) of the first rotary part (10) has slightly larger dimensions than the cross-section of rod (26) and the first rotary part (10) comprises a milling cutter-like portion (30) positioned level with said inlet and constructed so as to detach the welding spot when the rod penetrates the central passage (72) through the inlet and a truncated cone-shaped portion (75) widening from said milling cutter-like portion (30) to the area where the hole or holes (32) of the first rotary part (10) are located.

3. Machine according to claim 1, characterized in that the drive means (44) are located on one side of the system constituted by the two rotary parts (10, 12) and that it has other drive means (70) located on the other side of said system.

4. The machine according to claim 1, characterized in that it also has means for maintaining the wire (28) taut before the wire penetrates the central passage (72) of one of the rotary parts (10).

5. Machine according to claim 4, characterized in that said application means comprise a first roller (38) having a groove able to receive the rod (26), a second roller (36) having a groove able to receive the rod (26), the dimensions of the two rollers being such that their tangential speeds at the contact point with the rod are equal, means for forcing the second roller (36) in the direction of the first (38) and means for simultaneously rotating the two rollers (36, 38).

6. Machine according to claim 5, characterized in that the two rollers (38, 36) are toothed rollers with the same diameter and meshing on one another and in that said means for the simultaneous rotation of the two rollers (38, 36) comprise means for rotating the first roller (38) synchronized with means for the translation of rod (26), in order that said tangential speed is equal to the speed imparted to rod (26) by said translation means (44).

7. Machine according to claim 1, characterized in that the means for rotating the first rotary part (10) are synchronized, except during a milling phase, with the means for translating the rod (26), in such a way that the first rotary part (10) performs a complete turn when the rod (26) advances by a distance equal to the spacing of the spacing wire (28).

8. Machine according to claim 1, characterized in that the means for translating rod (26) comprise a carriage (46), a gripper (48) integral with carriage (46) and able to grip the rod (26) and means for translating the carriage (46).

9. Machine according to claim 8, characterized in that the means for driving the rod (26) also comprise a force limiter for controlling the force exerted by gripper (48) on rod (26).

10. Machine according to claim 9, characterized in that the means for translating the carriage (46) comprise an endless chain (50) having at least one linear portion, means for attaching the carriage (46) to said chain (50) in the linear portion thereof, a motor (52) for driving chain (50) and a torque limiter (56) associated with the motor (52) and constituting said force limiter.

11. Machine according to claim 8, characterized in that it also comprises a force transducer (121) connected on the one hand to the chain (50) and to the carriage (46) and on the other hand to a programmable automaton controlling the machine.

12. Machine according to claim 1, characterized in that it comprises at least one rod guide system.

13. Machine according to claim 12, characterized in that the guide system comprises a first roller (66) having a groove able to receive the rod (26), a second roller (68) which can be contacted with rod (26) when the latter is in said groove and means for applying the second roller (68) to the first.

14. Machine according to claim 13, characterized in that the abutting first roller (66) is placed beneath the second and its shaft or axis is substantially horizontal and in that said application means comprise an arm (114) rotatable about a horizontal shaft (118) carried by the machine and having a free end on which is mounted the second roller (68) and a counterweight (116), which can be fixed to said arm (114) at a desired location between its free end and the said shaft (118) carried by the machine.

15. Machine according to claim 13, characterized in that the abutting first roller (66) is placed beneath the second and has its axis or shaft substantially horizontal and in that said application means comprise an arm (114) rotatable about a horizontal shaft (118) carried by the machine and having a free end on which is mounted the second roller (68) and a jack (115) connected to arm (114) by a rod (117).

* * * * *